United States Patent
Jo et al.

(10) Patent No.: US 10,622,630 B2
(45) Date of Patent: Apr. 14, 2020

(54) POSITIVE ELECTRODE ACTIVE MATERIAL WITH CONCENTRATION GRADIENT OF DOPANT FOR LITHIUM SECONDARY BATTERY

(71) Applicant: LG Chem, Ltd., Seoul (KR)

(72) Inventors: Chi Ho Jo, Daejeon (KR); Sung Bin Park, Daejeon (KR); Young Uk Park, Daejeon (KR); Bo Ram Lee, Daejeon (KR); Hyuck Hur, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/771,885

(22) PCT Filed: Mar. 30, 2017

(86) PCT No.: PCT/KR2017/003487
§ 371 (c)(1),
(2) Date: Apr. 27, 2018

(87) PCT Pub. No.: WO2017/217645
PCT Pub. Date: Dec. 21, 2017

(65) Prior Publication Data
US 2018/0316007 A1 Nov. 1, 2018

(30) Foreign Application Priority Data

Jun. 17, 2016 (KR) .................. 10-2016-0075880

(51) Int. Cl.
 *H01M 4/525* (2010.01)
 *H01M 10/0525* (2010.01)
 *C01G 51/00* (2006.01)
 *H01M 4/131* (2010.01)
(Continued)

(52) U.S. Cl.
CPC ............ *H01M 4/525* (2013.01); *C01G 51/00* (2013.01); *C01G 51/42* (2013.01); *H01M 4/131* (2013.01);
(Continued)

(58) Field of Classification Search
None
See application file for complete search history.

(56) References Cited

U.S. PATENT DOCUMENTS

2001/0016285 A1    8/2001   Cho et al.
2004/0258836 A1*  12/2004  Besenhard ............ B82Y 30/00
                                                                                                427/180
(Continued)

FOREIGN PATENT DOCUMENTS

KR      20010081181 A    8/2001
KR      20050000353 A    1/2005
(Continued)

OTHER PUBLICATIONS

Extended European Search Report including Written Opinion for Application No. EP17813470.6 dated Jul. 27, 2018.
(Continued)

*Primary Examiner* — Daniel S Gatewood
(74) *Attorney, Agent, or Firm* — Lerner, David, Littenberg, Krumholz & Mentlik, LLP

(57) ABSTRACT

Provided is a positive electrode active material including lithium transition metal oxide for a lithium secondary battery, in which the lithium transition metal oxide includes a dopant diffusing from the surface of the lithium transition metal oxide particle, and the dopant is distributed with a concentration gradient from the center of the particle toward the surface thereof.

15 Claims, 3 Drawing Sheets

(51) Int. Cl.
  *H01M 4/485* (2010.01)
  *H01M 4/02* (2006.01)
(52) U.S. Cl.
  CPC ....... *H01M 4/485* (2013.01); *H01M 10/0525* (2013.01); *C01P 2002/54* (2013.01); *C01P 2006/40* (2013.01); *H01M 2004/028* (2013.01)

(56)　　　　　　　References Cited

U.S. PATENT DOCUMENTS

| | | |
|---|---|---|
| 2009/0269654 A1 | 10/2009 | Kairawicz et al. |
| 2011/0059367 A1 | 3/2011 | Morita et al. |
| 2016/0006026 A1 | 1/2016 | Paulsen et al. |
| 2016/0013476 A1 | 1/2016 | Oh et al. |
| 2016/0149210 A1 | 5/2016 | Yoo et al. |
| 2016/0156030 A1 | 6/2016 | Sun et al. |

FOREIGN PATENT DOCUMENTS

| | | |
|---|---|---|
| KR | 100864199 B1 | 10/2008 |
| KR | 20110027617 A | 3/2011 |
| KR | 20130077805 A | 7/2013 |
| KR | 20140142171 A | 12/2014 |
| KR | 20150050458 A | 5/2015 |
| KR | 20150144119 A | 12/2015 |
| KR | 20160061077 A | 5/2016 |

OTHER PUBLICATIONS

Search report from International Application No. PCT/KR2017/003487, dated Jul. 7, 2017.

* cited by examiner

POSITIVE ELECTRODE ACTIVE MATERIAL WITH CONCENTRATION GRADIENT OF DOPANT FOR LITHIUM SECONDARY BATTERY

CROSS-REFERENCE TO RELATED APPLICATIONS

The present application is a national phase entry under 35 U.S.C. § 371 of International Application No. PCT/KR2017/003487 filed Mar. 30, 2017, published in Korean, which claims priority from Korean Patent Application No. 10-2016-0075880, filed on Jun. 17, 2016, all of which are incorporated herein by reference in their entirety.

The present invention relates to a positive electrode active material with a concentration gradient of a dopant for a lithium secondary battery.

BACKGROUND ART

As technology development and demands for mobile devices increase, demands for secondary batteries as energy sources are rapidly increasing. Among the secondary batteries, lithium secondary batteries having high energy density and working potential, a long cycle life, and a low self-discharge rate have been commercialized and widely used.

Further, with growing concerns about environmental issues, many researches have been conducted on electric vehicles and hybrid electric vehicles which may be employed in place of fossil fuel-based vehicles such as gasoline vehicles, diesel vehicles, etc., which are one of major causes of air pollution. Use of lithium secondary batteries having high energy density and discharge voltage as power sources for such electric vehicles and hybrid electric vehicles has been actively studied, and commercialization thereof has been also actively carried out.

As a positive electrode material for the lithium secondary battery, $LiCoO_2$, a ternary system material (NMC/NCA), $LiMnO_4$, $LiFePO_4$, etc. is currently used. Of them, $LiCoO_2$ has problems in that cobalt is expensive and $LiCoO_2$ has low capacity at the same voltage, as compared with ternary system materials. Therefore, use of ternary system materials is gradually increasing in order to increase the capacity of secondary batteries.

$LiCoO_2$ has excellent physical properties such as high rolling density, etc., and excellent electrochemical properties such as high cycling property, and therefore, it has been frequently used until now. However, since $LiCoO_2$ has a charge/discharge current capacity as low as about 150 mAh/g, and its crystal structure is unstable at a high voltage of 4.3 V or more, it has problems of a rapid reduction of lifetime property and ignition caused by reactions with an electrolyte.

In particular, when a high voltage is applied to $LiCoO_2$ in order to develop a high capacity secondary battery, Li usage of $LiCoO_2$ is increased, which may increase possibility of surface instability and structural instability.

To solve these problems, a method of doping or coating the surface of $LiCoO_2$ with a metal such as Al, Ti, Mg, or Zr is generally suggested. However, there are restrictions on the methods, structural stability is still poor, sufficient lifetime characteristics are not obtained, or capacity deterioration occurs.

Accordingly, it is highly necessary to develop a lithium cobalt oxide-based positive electrode active material which may be stably used without deterioration of battery performances at high voltages.

DISCLOSURE

Technical Problem

An object of the present invention is to solve the above-described problems of the prior art and the technical problems which have been demanded to be solved.

The present inventors have conducted intensive studies and various experiments, and as described below, they found that when a positive electrode active material including a dopant which is diffused with a decreasing concentration gradient from the surface of a lithium transition metal oxide particle toward the center thereof is used, desired effects may be achieved, thereby completing the present invention.

Technical Solution

The negative electrode may be fabricated by applying a negative electrode active material onto a negative electrode collector and drying the collector. If necessary, the above-described components may be further included, optionally.

A positive electrode active material for a lithium secondary battery, the positive electrode active material may have lithium transition metal oxide represented by the following Chemical Formula 1, wherein the lithium transition metal oxide includes a dopant diffusing from a surface of a lithium transition metal oxide particle, and the dopant is distributed with a concentration gradient from a center of the lithium transition metal oxide particle toward the surface thereof, wherein 99 at % or more of the dopant is distributed within the depth range of 100 nm from the surface of the lithium transition metal oxide particle toward the center thereof:

$$Li_aCo_{1-x}M_xO_2 \quad (1)$$

wherein 0.95≤a≤1.05; 0<x≤0.2, and
M is Al.

In one embodiment, 90 at % or more of the dopant is distributed in the range of 0.5 r to 1 r, based on a mean radius (r) of the lithium transition metal oxide particle.

In another embodiment, the dopant is distributed within the depth range of 500 nm from the surface of the lithium transition metal oxide particle toward the center thereof.

In one embodiment, the lithium transition metal oxide shows Li-deficiency on the surface of the particle.

Further, a method of preparing the positive electrode active material is provided and includes:

(a) preparing a lithium transition metal oxide particle and a doping precursor;

(b) coating a surface of the lithium transition metal oxide particle with the doping precursor by mixing the lithium transition metal oxide particle and the doping precursor; and (c) calcining the doping precursor-coated lithium transition metal oxide particle, wherein the doping precursor is one or more selected from the group consisting of a metal, metal oxide, and a metal salt.

The negative electrode collector is generally fabricated in a thickness of 3 μm to 500 μm. The negative electrode collector is not particularly limited, as long as it has conductivity without causing chemical changes in the battery. For example, copper, stainless steel, aluminum, nickel, titanium, sintered carbon, and copper or stainless steel having a surface treated with carbon, nickel, titanium, or silver, aluminum-cadmium alloys, etc. may be used. Like the positive electrode collector, the negative electrode collector may also be processed to form fine irregularities on the surface thereof so as to enhance adhesive strength to the negative electrode active material. The collector may be used in various forms including films, sheets, foils, nets, porous structures, foams, non-woven fabrics, etc.

The negative electrode active material may include, for example, carbon such as non-graphitized carbon, graphitized carbon, etc.; metal composite oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group I, II or III elements of the periodic table, halogen; $0 < x \le 1$; $1 \le y \le 3$; $1 \le z \le 8$), etc.; lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$, etc.; conductive polymers such as polyacetylene, etc.; Li—Co—Ni-based materials.

The separator is interposed between the positive electrode and the negative electrode. As the separator, an insulating thin film having high ion permeability and mechanical strength is used. The separator generally has a pore diameter of 0.01 μm to 10 μm and a thickness of 5 μm to 300 μm. As the separator, for example, a sheet or non-woven fabric made of olefin polymer, such as polypropylene having chemical resistance and hydrophobicity, etc.; glass fiber or polyethylene is used. When a solid electrolyte such as a polymer is employed as the electrolyte, the solid electrolyte may also serve as the separator.

The non-aqueous electrolyte containing lithium salts is composed of a non-aqueous electrolyte and lithium salt. A non-aqueous organic solvent, an organic solid electrolyte, or an inorganic solid electrolyte may be used as the non-aqueous electrolyte. However, the non-aqueous electrolyte is not limited thereto.

The non-aqueous organic solvent may be, for example, a non-protic organic solvent such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing ionic dissociation groups, etc.

The inorganic solid electrolyte may include, for example, Li-based nitrides, halides, or sulfates such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

The lithium salts are readily dissolved in the non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroboran lithium, lower aliphatic carboxylic acid lithium, lithium tetraphenyl borate, imides, etc.

In order to improve charge/discharge characteristics and flame retardancy in the non-aqueous electrolyte, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethyleneglycol dialkylether, ammonium salts, pyrrol, 2-methoxy ethanol, aluminum trichloride, etc. may be added. Optionally, halogen-containing solvents such as carbon tetrachloride or ethylene trifluoride may be further added in order to obtain flame resistance, or carbon dioxide gas may be further added in order to enhance high-temperature retention properties, and FEC (Fluoro-Ethylene Carbonate), PRS (Propene sultone), etc. may be further added.

Further, the present invention provides a battery pack including the secondary battery, and a device including the battery pack, and the above battery pack and device are known in the art, and therefore, specific descriptions thereof will be omitted in the present invention.

The device may be, for example, notebook computers, netbooks, tablet PC, mobile phones, MP3, wearable electronics, power tools, electric vehicles (EV), hybrid electric vehicles (HEV), plug-in hybrid electric vehicles (PHEV), E-bike, E-scooter, electric golf carts, or electric storage systems, etc., but is not limited thereto.

DETAILED DESCRIPTION OF THE EMBODIMENTS

Figure 1:
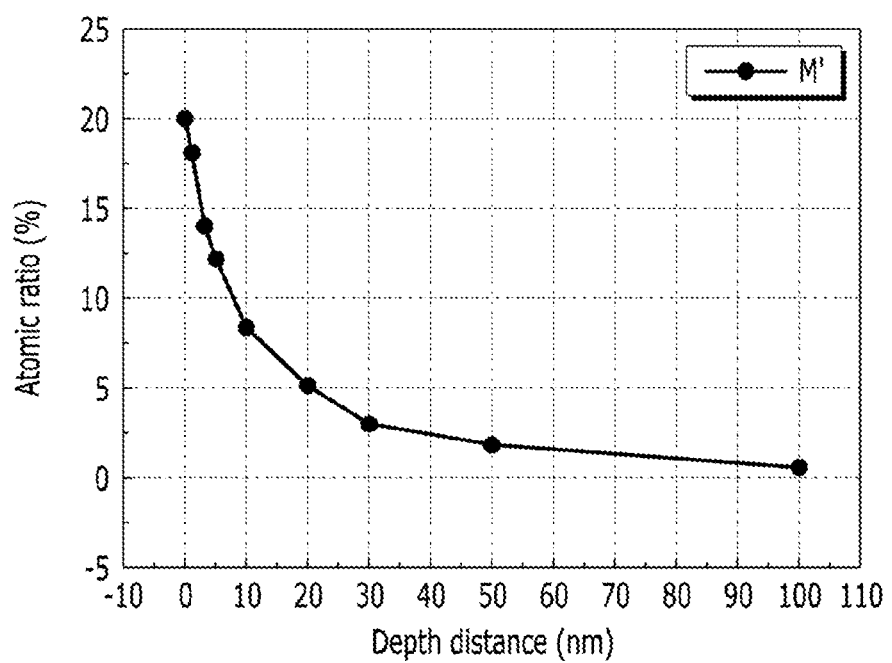
FIG. 1 is an XPS graph of a positive electrode active material according to Example 1.

Hereinbelow, the present invention will be described with reference to Examples. A better understanding of the present invention may be obtained in light of the following Examples, but are not to be construed to limit the scope of the present invention.

Preparation of Positive Electrode Active Material

Example 1

$LiCoO_2$ as a lithium transition metal oxide particle and $Al_2O_3$ as a doping precursor were mixed at a molar ratio of Co:Al of 99.9:0.1, and then heat-treated at 675° C. for 8 hours to prepare a positive electrode active material particle of $LiCo_{0.999}Al_{0.001}O_2$ in which Al was doped onto lithium cobalt oxide to diffuse into the center thereof.

Example 2

$LiCoO_2$ as a lithium transition metal oxide particle and $Al_2O_3$ as a doping precursor were mixed at a molar ratio of Co:Al of 99.8:0.2, and then heat-treated at 750° C. for 8 hours to prepare a positive electrode active material particle of $LiCo_{0.998}Al_{0.002}O_2$ in which Al was doped onto lithium cobalt oxide to diffuse into the center thereof.

Example 3

$LiCoO_2$ as a lithium transition metal oxide particle and $Al_2O_3$ as a doping precursor were mixed at a molar ratio of Co:Al of 99.8:0.2, and then heat-treated at 950° C. for 10 hours to prepare a positive electrode active material particle of $LiCo_{0.998}Al_{0.002}O_2$ in which Al was doped onto lithium cobalt oxide to diffuse into the center thereof.

Example 4

$LiCoO_2$ as a lithium transition metal oxide particle and $Al_2O_3$ as a doping precursor were mixed at a molar ratio of Co:Al of 99.7:0.3, and then heat-treated at 750° C. for 8 hours to prepare a positive electrode active material particle of $LiCo_{0.997}Al_{0.003}O_2$ in which Al was doped onto lithium cobalt oxide to diffuse into the center thereof.

Example 5

$LiCoO_2$ as a lithium transition metal oxide particle and $Al_2O_3$ as a doping precursor were mixed at a molar ratio of Co:Al of 99.9:0.01, and then heat-treated at 1,000° C. for 8 hours to prepare a positive electrode active material particle of $LiCo_{0.999}Al_{0.001}O_2$ in which Al was doped onto lithium cobalt oxide to diffuse into the center thereof.

Comparative Example 1

$LiCoO_2$ was used as a positive electrode active material particle without doping with a doping precursor and heat treatment.

Comparative Example 2

31 g of $Co_3O_4$, 19.0 g of $Li_2CO_3$, and 26.9 mg of $Al_2O_3$ were weighed and sufficiently dry-mixed to obtain a mixture. The mixture was calcined at 900° C. to 1,100° C. for 5 hours to 20 hours to obtain a calcination product, which was pulverized and size-sorted to prepare a positive electrode active material particle of $Li_{1.001}Co_{0.99}Al_{0.1}O_2$.

Comparative Example 3

$LiCoO_2$ as a lithium transition metal oxide particle and $Al_2O_3$ as a doping precursor were mixed at a molar ratio of Co:Al of 99.8:0.2, and then heat-treated at 400° C. for 5 hours to prepare a positive electrode active material particle of $LiCo_{0.998}Al_{0.002}$ in which Al was doped onto lithium cobalt oxide to diffuse into the center thereof.

Experimental Example 1

Measurement of XPS Graph

Figure 2:
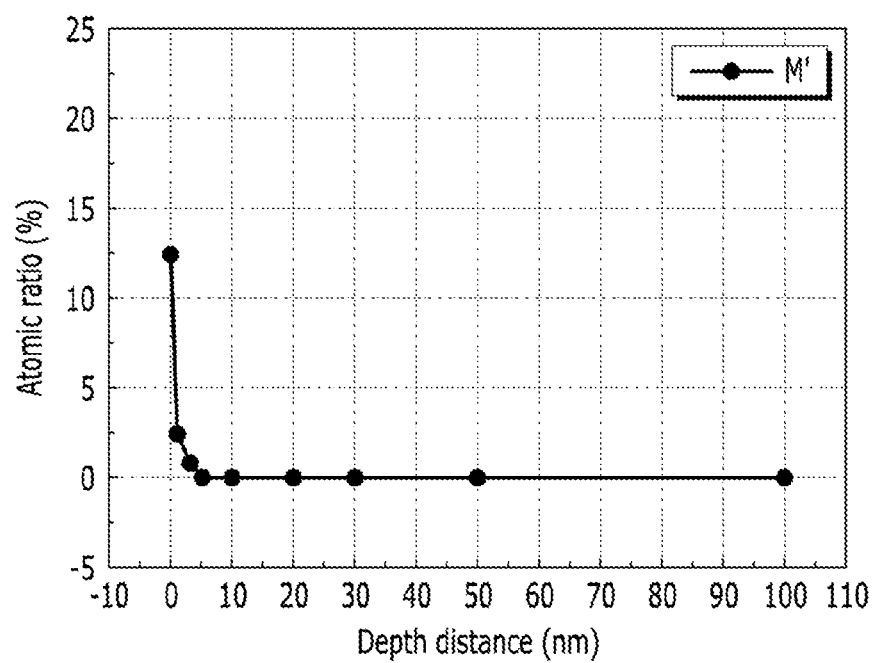
FIG. 2 is an XPS graph of a positive electrode active material according to Comparative Example 3.

XPS (X-ray photoelectron spectroscopy) was carried out by using the positive electrode active materials prepared in Example 1 and Comparative Example 3, and the results are as in graphs of FIGS. 1 and 2, respectively.

Referring to FIGS. 1 and 2, the positive electrode active material of Example 1 which was heat-treated for a relatively short time but calcined at a relatively high temperature showed active diffusion of the doping precursor, as compared with the positive electrode active material of Comparative Example 3. Therefore, it can be seen that the calcination temperature has a greater influence on the diffusion of the doping precursor than the calcination time.

In contrast, the positive electrode active material of Comparative Example 3 showed diffusion of a small amount of the doping precursor into the lithium cobalt oxide particles, but the dopant (M') was merely distributed within a depth range of about 5 nm or more from the surface of the particle toward the center thereof, and diffusion hardly occurred in the deeper part of the particle.

In contrast, the positive electrode active material of Example 1 showed diffusion of the dopant (M') in a depth range of up to 100 nm from the surface of the lithium cobalt oxide particle toward the center thereof, indicating that the concentration of the dopant (M') distributed on the surface was higher, and the concentration of the dopant (M') decreased as it was deeper toward the center.

Manufacture of Secondary Battery

Example 6

The positive electrode active material prepared in Example 1 and 1.0% by weight of carbon black as a conductive material were mixed, and 3% by weight of PVdF was mixed thereto to prepare a positive electrode mixture, which was stirred together with NMP as a solvent. Then, the mixture was applied to an aluminum foil which is a metal collector, and dried in a vacuum oven at about 120° C. for 2 hour or longer to manufacture a positive electrode. As a negative electrode, a lithium foil was used, and an electrolyte containing 1M $LiPF_6$ in a solvent of EC:DMC:DEC=1:2:1 was used to manufacture a coin-type half cell.

Comparative Example 4

A coin-type half cell was manufactured in the same manner as in Example 6, except that the positive electrode active material prepared in Comparative Example 3 was used.

Experimental Example 2

High-voltage lifetime characteristics of coin-type half cells manufactured in Example 6 and Comparative Example 4 respectively were measured. High-voltage lifetime characteristics were examined by measuring a discharge capacity for 50 cycles, in which 1 cycle was defined as performing charging/discharging at 0.5 C/1.0, an upper voltage limit of 4.55 V and 25° C. The results are shown in FIG. 3.

Figure 3:
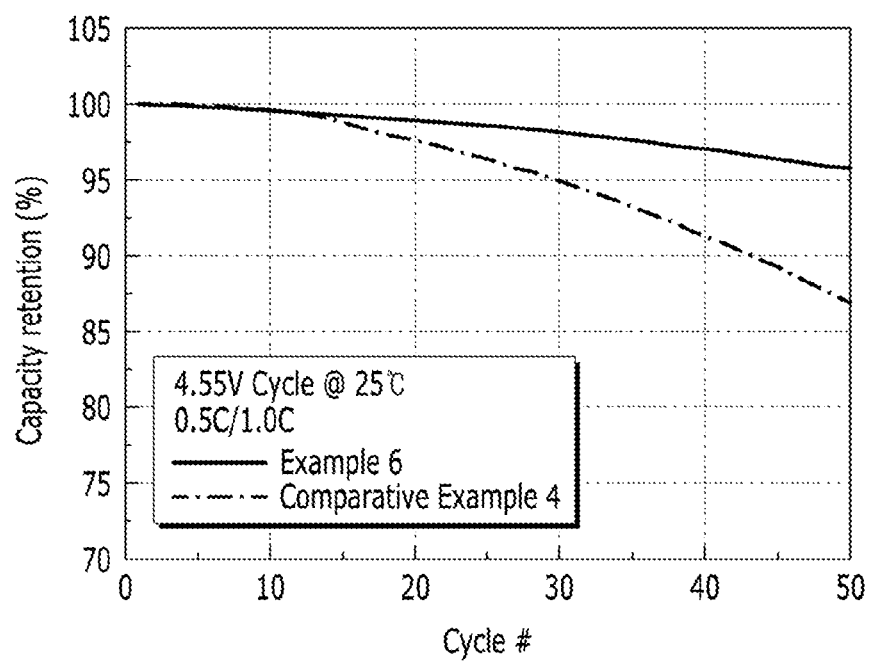
FIG. 3 is a graph showing cycling characteristics of coin-type half cells according to Example 6 and Comparative Example 4.

As shown in FIG. 3, the coin-type half cell of Comparative Example 4 showed a reduction of discharge capacity before 20 cycles, and the discharge capacity was reduced to 87% of the initial capacity at 50 cycles. In contrast, the coin-type half cell of Example 6 showed the capacity reduction much less than that of Comparative Example 4, and maintained at least 95% or more of the initial capacity at 50 cycles. Accordingly, it can be seen that when the concentration gradient of the dopant is formed in a predetermined range, lifetime characteristic is improved.

It will be apparent to those skilled in the art that various modifications and changes may be made thereto from the foregoing description without departing from the scope of the present invention.

INDUSTRIAL APPLICABILITY

As described above, the positive electrode active material according to the present invention includes a dopant diffusing from the surface of a lithium transition metal oxide particle, in which the dopant is distributed with a concentration gradient from the center of the particle toward the surface thereof. Therefore, surface stability of the lithium transition metal oxide may be improved even by a small amount of the dopant with a concentration gradient on the surface of the positive electrode active material, and side reaction between a transition metal constituting the lithium transition metal oxide and an electrolyte may be suppressed, thereby preventing deterioration of overall performances of a lithium secondary battery and improving a lifetime characteristic and stability of the battery.

Further, conductivity of the positive electrode active material may be decreased by surface-doping with the dopant having low conductivity, thereby obtaining excellent results in a safety test such as a nail test, a hot-box test, etc.

The invention claimed is:

1. A positive electrode active material for a lithium secondary battery, the positive electrode active material comprising lithium transition metal oxide represented by the following Chemical Formula 1, $$Li_aCo_{1-x}M_xO_2 \quad (1)$$

wherein $0.95 \leq a \leq 1.05$; $0 < x \leq 0.2$, and
M is Al
wherein the lithium transition metal oxide includes a dopant diffusing from a surface of a lithium transition metal oxide particle, and the dopant is distributed with a concentration gradient from a center of the lithium transition metal oxide particle toward the surface thereof, and
wherein 95% or more of the dopant is distributed within the depth range of 100 nm from the surface of the lithium transition metal oxide particle toward the center thereof.

2. The positive electrode active material of claim 1, wherein 90% or more of the dopant is distributed in the range of 0.5 r to 1 r, based on a mean radius (r) of the lithium transition metal oxide particle.

3. The positive electrode active material of claim 1, wherein the dopant is distributed within the depth range of 500 nm from the surface of the lithium transition metal oxide particle toward the center thereof.

4. The positive electrode active material of claim 1, wherein 90% or more of the dopant is distributed within the depth range of 50 nm from the surface of the lithium transition metal oxide particle toward the center thereof.

5. The positive electrode active material of claim 1, wherein the dopant shows a decreasing concentration gradient from the surface of the lithium transition metal oxide particle toward the center thereof.

6. The positive electrode active material of claim 5, wherein the concentration gradient of the dopant shows a decreasing graph of a quadratic function of a content change of the dopant versus a distance (L) from the surface of the lithium transition metal oxide particle toward the center thereof.

7. The positive electrode active material of claim 1, wherein the lithium transition metal oxide shows Li-deficiency on the surface of the particle.

8. The positive electrode active material of claim 1, wherein the lithium transition metal oxide exhibits charge/discharge characteristics at 3.0 V to 4.55 V.

9. A method of preparing the positive electrode active material of claim 1, the method comprising:
(a) preparing a lithium transition metal oxide particle and a doping precursor;
(b) coating the surface of the lithium transition metal oxide particle with the doping precursor by mixing the lithium transition metal oxide particle and the doping precursor; and
(c) calcining the doping precursor-coated lithium transition metal oxide particle.

10. The method of claim 9, wherein the doping precursor is one or more selected from the group consisting of a metal, metal oxide, and a metal salt.

11. The method of claim 9, wherein in (c), the dopant of the doping precursor diffuses into the lithium transition metal oxide particles.

12. The method of claim 9, wherein the calcination temperature of (c) is 500° C. to 1000° C.

13. The method of claim 9, wherein the calcination time of (c) is 3 hours to 20 hours.

14. A positive electrode for a secondary battery, the positive electrode comprising the positive electrode active material of claim 1.

15. A lithium secondary battery comprising the positive electrode of claim 14, a negative electrode, and an electrolyte.

* * * * *